(12) United States Patent
Kitami et al.

(10) Patent No.: US 6,722,168 B2
(45) Date of Patent: Apr. 20, 2004

(54) STEERING LOCKING DEVICE

(75) Inventors: Etsurou Kitami, Yamatokooriyama (JP); Tomohiro Maekawa, Habikino (JP); Terukazu Nakajima, Yamatotakada (JP); Takaya Akiyama, Kashihara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/231,080

(22) Filed: Aug. 30, 2002

(65) Prior Publication Data

US 2003/0041635 A1 Mar. 6, 2003

(30) Foreign Application Priority Data

Sep. 5, 2001 (JP) ......................................... 2001-269133

(51) Int. Cl.⁷ ........................... B60R 25/02; F16C 3/00; G05G 5/00
(52) U.S. Cl. ........................................... 70/186; 70/183
(58) Field of Search ........................... 70/186, 187, 252, 70/182–185

(56) References Cited

U.S. PATENT DOCUMENTS

| 3,795,122 | A | * | 3/1974 | Lipschutz .................... 70/182 |
| 4,570,468 | A | * | 2/1986 | Bemm et al. .................. 70/252 |
| 4,854,141 | A | * | 8/1989 | Haldric et al. ................. 70/182 |
| 5,730,010 | A | * | 3/1998 | Norimatsu et al. ............ 70/186 |
| 5,937,500 | A | * | 8/1999 | Bobbitt, III ................... 29/516 |
| 6,076,382 | A | * | 6/2000 | Naganuma .................... 70/186 |
| 6,094,951 | A | * | 8/2000 | Cusati .......................... 70/189 |
| 6,233,986 | B1 | * | 5/2001 | Suzuki et al. ................. 70/186 |

FOREIGN PATENT DOCUMENTS

| JP | 7-291095 | 11/1995 |
| JP | 8-34317 | 2/1996 |
| JP | 8-253105 | 10/1996 |

* cited by examiner

*Primary Examiner*—John B. Walsh
(74) *Attorney, Agent, or Firm*—Rabin & Berdo, PC

(57) ABSTRACT

A steering locking device has an annular clearance provided between a steering shaft and a collar surrounding the steering shaft. A spacer is press-fitted in the annular clearance, to form a circular arc shape surrounding the steering shaft. The spacer is wound around the steering shaft from the outside of the collar through the opening of the collar. When a locking member supported on a locking device main body is at a locked position, the collar is prevented from being rotated. When a torque applied to the steering shaft is not more than a predetermined torque, the spacer prevents the relative rotation between the steering shaft and the collar.

10 Claims, 6 Drawing Sheets

STEERING LOCKING DEVICE

CROSS REFERENCE TO RELATED APPLICATION

This application claims priority benefits under 35 USC §119 of Japanese Patent Application Serial No. 2001-269133, the disclosure of which is incorporated by reference.

BACKGROUND OF THE INVENTION

1. Field of the Invention

The present invention relates to a steering locking device for preventing an automobile from being stolen.

2. Description of Related Arts

The above-mentioned steering locking device has an annular collar fitted in an outer periphery of a steering shaft so as to be relatively rotatable through an annular spacer and a locking device main body fixed to a steering column, for example.

The locking device main body is provided with a locking pin which can advance and retreat. The locking pin advances into the steering column at the time of steering locking and is engaged with a hole in the collar, thereby preventing the collar from being rotated. Correspondingly, the steering shaft is prevented from being rotated.

When a torque applied between the steering shaft and the collar exceeds a defined torque value, the annular spacer allows the collar to be rotated relative to the steering shaft. When an excessive torque is applied to the steering shaft in a steering locked state, therefore, the steering shaft can be rotated, thereby preventing the locking device from being damaged.

The above-mentioned annular spacer forms a wave shape, the tops of the wave shape being arranged along its circumference. The annular spacer is pressed between the steering shaft and the collar along the axis of the steering shaft.

In order to precisely manage the defined torque value, strict dimensional accuracy is required with respect to the respective components such as the annular spacer, the steering shaft, and the collar. Therefore, the processing cost of each of the components rises. As a result, the manufacturing cost of the steering locking device rises. Further, the annular spacer forming a wave shape is complicated in structure and is high in cost. Accordingly, the manufacturing cost of the steering locking device further rises.

SUMMARY OF THE INVENTION

An object of the present invention is to provide a low cost steering locking device which allows a locked steering shaft to be rotated when a torque exceeding a defined torque value is applied to the steering shaft.

In a preferred mode of the present invention, a steering locking device for restraining the operation of a steering wheel at the time of locking comprises a collar surrounding a steering shaft which is rotated integrally with the steering wheel; an annular clearance formed between an outer periphery of the steering shaft and an inner periphery of the collar; a spacer press-fitted in the annular clearance and formable into a circular arc shape surrounding the steering shaft; a locking device main body fixed to a fixing member such as a jacket of a steering column; and a locking member supported on the locking device main body and displaceable to a locked position for preventing the collar from being rotated and a locking released position. The relative rotation between the steering shaft and the collar is restrained by the spacer in a case where a torque applied to the steering shaft is not more than a predetermined torque when the collar is prevented from being rotated by the locking member at the locked position. The spacer is formed of members which are woundable around the steering shaft from the outside of the collar through the opening of the collar.

According to the present embodiment, the spacer can be easily assembled in the annular clearance. The spacer is also autonomously adjusted to actual diameters of the steering shaft and the collar to be assembled. As a result, the respective dimensional tolerances of components such as the spacer, the steering shaft, and the collar may not be made strict, thereby making it possible to reduce the costs of the components.

Preferably, the spacer is connected to either the steering shaft or the collar so as to be integrally rotatable. When the spacer is connected to the steering shaft, for example, so as to be integrally rotatable, frictional resistance between the spacer and the steering shaft need not be considered. Consequently, surface roughness of an opposite portion between the spacer and the steering shaft may not be strictly managed. As a result, the costs of the components can be further reduced.

Moreover, a state where the spacer is press-fitted is suitably adjusted as the diameter is adjusted. Accordingly, the value of the predetermined torque hardly varies.

DETAILED DESCRIPTION OF THE PREFERRED EMBODIMENT

Figure 1:
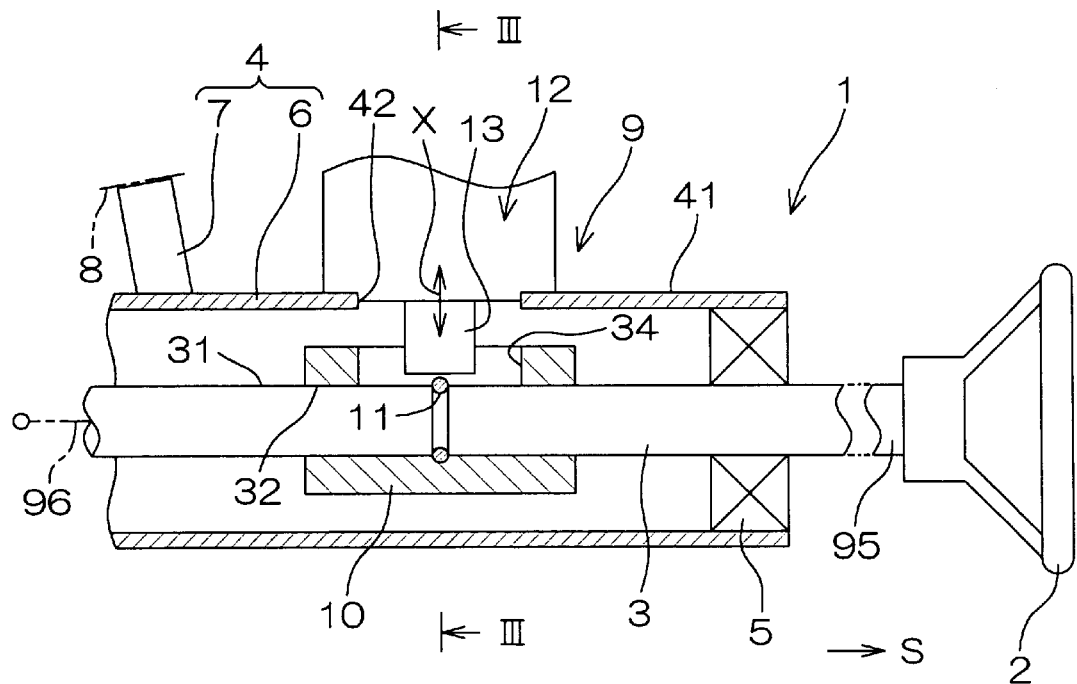
FIG. 1 is a schematic view showing the schematic configuration of a steering apparatus having a steering locking device according to an embodiment of the present invention.

A steering locking device according to one embodiment of the present invention will be described while referring to the drawings. FIG. 1 is a schematic view showing the schematic configuration of a steering apparatus having the steering locking device according to one embodiment of the present invention.

The steering apparatus 1 has a steering shaft 3 for transmitting the movement of a steering wheel 2 in order to steer wheels (not shown) and a steering column 4 for supporting the steering shaft 3 so as to be rotatable with the steering shaft 3 passed therethrough. The steering wheel 2 is connected to one end 95 of the steering shaft 3 so as to be integrally rotatable. When the steering wheel 2 is rotated, the rotation is transmitted to a steering mechanism (not shown) including a pinion, a rack shaft, and so forth through the steering shaft 3, an intermediate shaft (not shown) connected to the other end 96 of the steering shaft 3 so as to be integrally rotatable, and so forth, thereby making it possible to steer the wheels.

The steering column 4 has a cylindrical jacket 6 accommodating the steering shaft 3 and supporting the steering shaft 3 so as to be rotatable through one or a plurality of bearings 5 (only one of the bearings 5 is illustrated in FIG. 1) and a bracket 7 fixed to an outer periphery 41 of the jacket 6. The jacket 6 positions the steering shaft 3 through the bearings 5 in the axial direction (see an arrow S).

The steering column 4 is fixed by the bracket 7 to a vehicle body 8 so as not to be rotatable. The steering column 4 is provided with a steering locking device 9 for preventing an automobile from being stolen.

The steering locking device 9 has an annular collar 10 formed separately from the steering shaft 3 and mounted on an outer periphery 31 of the steering shaft 3 so as to be relatively rotatable, a spacer 11 interposed between the outer periphery 31 of the steering shaft 3 and an inner periphery 32 of the collar 10 for restraining the relative rotation between the steering shaft 3 and the collar 10, and a locking device main body 12, fixed to the outer periphery 41 of the jacket 6 in the steering column 4, serving as a fixing member (an irrotational member).

Figure 2:
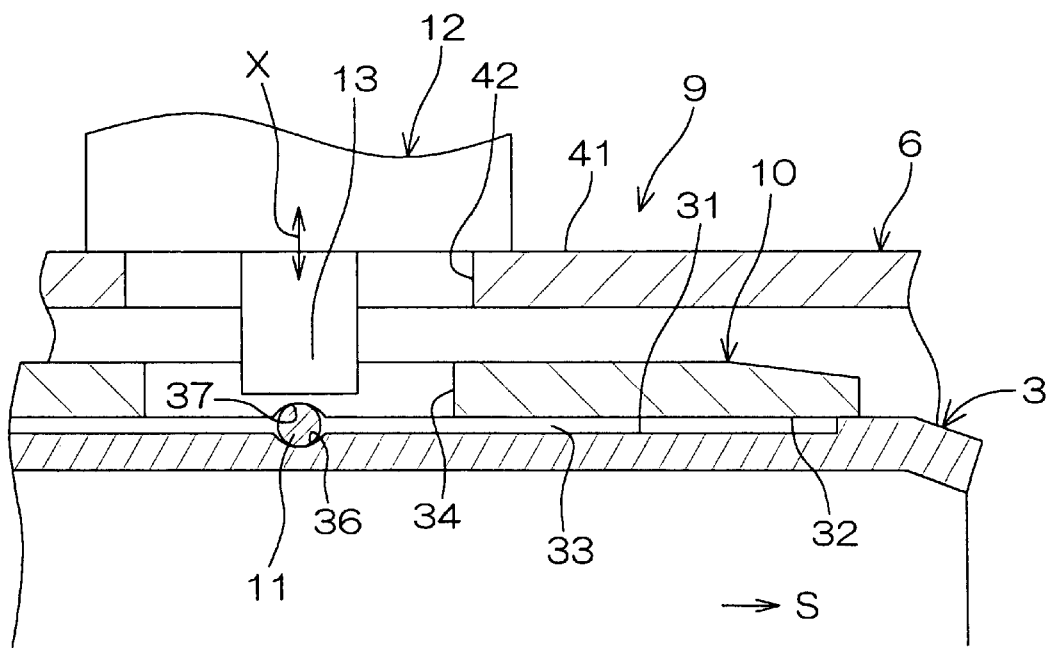
FIG. 2 is a partially sectional side view showing the steering locking device shown in FIG. 1 and its peripheral part.
Figure 3:
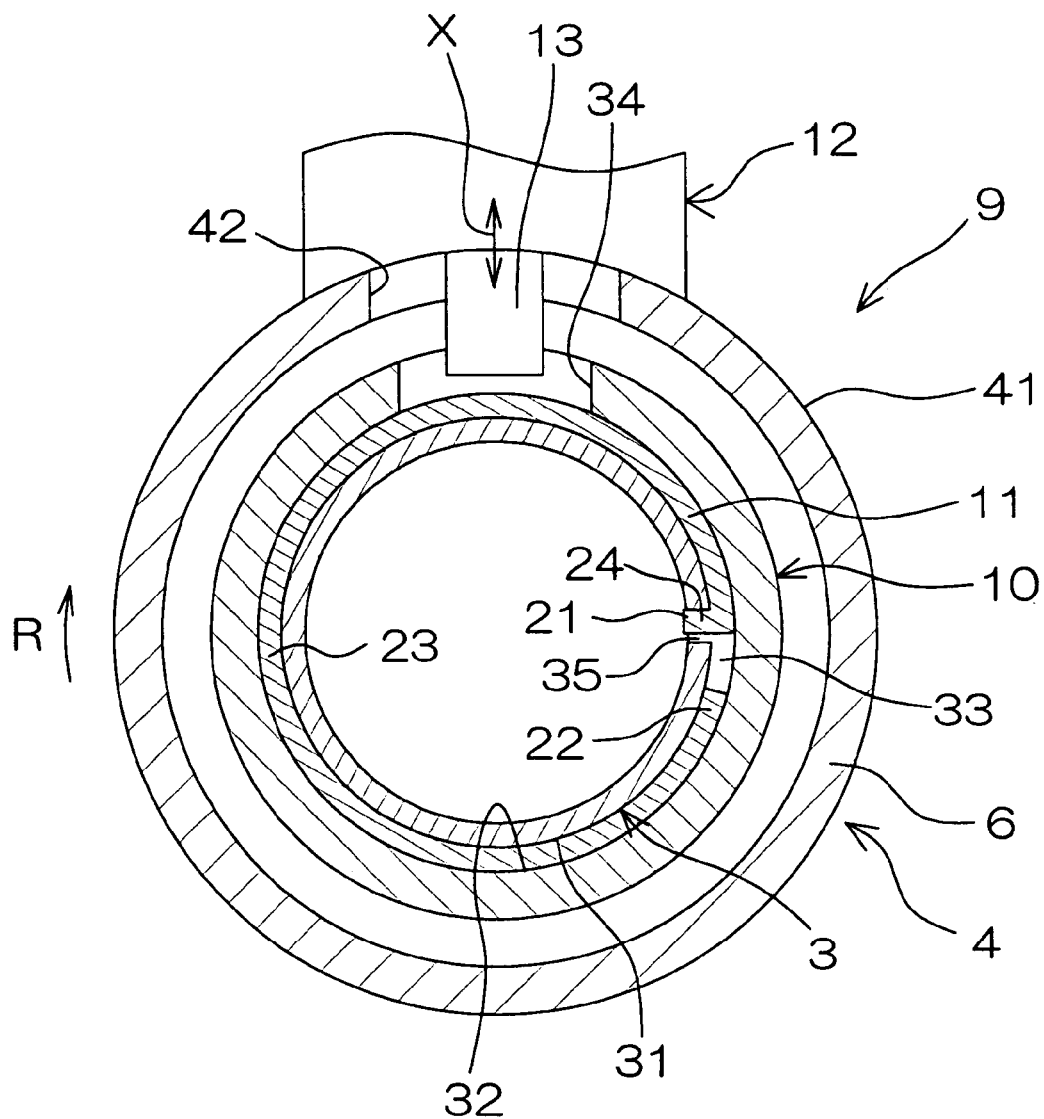
FIG. 3 is a partially sectional view of a steering device taken along a line A—A shown in FIG. 1.

The locking device main body 12 is held in a housing fixed to the steering column 4. The locking device main body 12 has a movable locking key 13 serving as a locking member. The locking key 13 is supported so as to be displaceable in a predetermined direction X at a locked position where it is fitted in a locking hole 34 in the collar 10 and a locking released position for releasing engagement with the locking hole 34, as shown in FIGS. 1, 2, and 3.

Furthermore, a cam mechanism for causing the locking key 13 to advance to and retreat from the locking hole 34, a key cylinder for operating the cam mechanism by a predetermined operation key, and an ignition key switch connected to the key cylinder through the cam mechanism, which are not illustrated, are provided in the housing.

A through hole 42 is formed in the outer periphery 41 of the steering column 4 so as to correspond to the locking device main body 12. The through hole 42 connects the inside and the outside of the jacket 6 so that the locking key 13 can be inserted into the through hole 42. The locking hole 34 serving as an opening is provided in the collar 10 so as to correspond to the through hole 42.

An annular clearance 33 (see FIGS. 2 and 3) is defined between the inner periphery 32 of the collar 10 and the outer periphery 31 of the steering shaft 3. The spacer 11, forming a circular arc shape, is mounted in the annular clearance 33. As shown in FIG. 2, the spacer 11 is accommodated in the annular clearance 33 so as to extend over both a peripheral groove 36, which is semi-circular in cross section, formed on the outer periphery 31 of the steering shaft 3 and a peripheral groove 37, which is semi-circular in cross section, formed on the inner periphery 32 of the collar 10.

Referring to FIG. 3, the spacer 11 has first and second ends 21 and 22, and has a main body section 23 extending from the first end 21 to the second end 22. The main body section 23 forms a circular arc shape extending along the annular clearance 33, and is brought into a press-fitted state in the annular clearance 33. An engagement section 24 is formed at the first end 21. The engagement section 24 is engaged with an engagement hole 35 formed in the steering shaft 3, so that the spacer 11 including the main body section 23 is fixed to the steering shaft 3 so as not to be relatively rotatable. On the other hand, the spacer 11 is rotatable relative to the collar 10 with predetermined frictional resistance.

As described in the foregoing, the main body section 23 of the spacer 11 is interposed in a press-fitted state between the steering shaft 3 and the collar 10. When the steering locking device 9 is locked, the spacer 11 creates frictional resistance for restraining the relative rotation between the steering shaft 3 and the collar 10. Specifically, when the spacer 11 is connected to the steering shaft 3 so as to be integrally rotatable, as shown in FIG. 3, the relative rotation between the steering shaft 3 and the collar 10 is restrained by the frictional resistance created between the spacer 11 and the collar 10.

When an operation key (ignition key) is set in a position where the key cylinder is operable, the steering locking device 9 is brought into a locking released state. Accordingly, the locking key 13 retreats outward from the locking hole 34. In the locking released state, the steering shaft 3, together with the collar 10 and the spacer 11, can be freely rotated, so that the steering wheel 2 is steerable.

When the above-mentioned operation key is set in a predetermined position where the key cylinder is locked, the steering locking device 9 is brought into a locked state. In the locked state, the locking key 13 which has been inserted into the locking hole 34 through the through hole 42 is engaged with the locking hole 34, thereby preventing the collar 10 from being rotated.

When a torque having a value which is not more than a predetermined value is applied to the steering shaft 3, the relative rotation between the steering shaft 3 and the collar 10 is regulated by the frictional resistance between the spacer 11 and the collar 10. As a result, the steering shaft 3 is prevented from being rotated.

When a large torque having a value exceeding the predetermined value is applied to the steering shaft 3, the relative rotation between the steering shaft 3 and the collar 10 is allowed. In order to rotate the steering shaft 3 in a state where the steering locking device 9 is locked, a predetermined operation torque, exceeding a frictional resistance torque, by the spacer 11 is required. The predetermined operation torque is significantly larger than an operation torque for rotating the steering shaft 3 at the normal time in the locking released state. Therefore, it is significantly difficult to operate the steering wheel 2 at the time of locking.

According to the present embodiment, the spacer 11 has the main body section 23 forming a circular arc shape extending along the annular clearance 33 and brought into a press-fitted state in the annular clearance 33. The main body section 23 of the spacer 11 is assembled in the annular clearance, being autonomously adjusted to the actual diameters of the steering shaft 3 and the collar 10. Consequently, the respective dimensional tolerances of the spacer 11, the steering shaft 3 and the collar 10 may not necessarily be made strict, and the costs of the components can be reduced.

The spacer 11 need not be rotated relative to the steering shaft 3 to create frictional resistance. Consequently, surface roughness of opposite portions between the spacer 11 and the steering shaft 3 need not be strictly managed. As a result, the costs of the components can be reduced. Moreover, since a state where the spacer 11 is press-fitted is suitably adjusted, there are few variations in the torque value. That is, a torque required to rotate the steering shaft 3 at the time of locking can be easily set to a level at which the steering locking device 9 is not destroyed and a level at which the steering shaft 3 is not unnecessarily operated at the time of locking.

As an example of a manner in which the spacer 11 is fixed to the steering shaft 3 (that is, the spacer 11 is connected to the steering shaft 3 so as to be integrally rotatable), a manner in which the engagement section 24 provided so as to extend at one end of the spacer 11 is caught by the engagement hole 35 in the steering shaft 3 can be mentioned, as shown in FIG. 3.

A projection of the steering shaft 3 may be fitted in an engagement hole in the spacer 11, or a pair of engagement sections each comprising a projection and a recess which are engaged with each other may be provided in corresponding areas of the steering shaft 3 and the spacer 11, which is not illustrated. In addition thereto, the spacer 11 can be also fixed to the steering shaft 3 utilizing a known fixing method such as caulking.

Furthermore, the main body section 23 of the spacer 11 may be made rotatable relative to the steering shaft 3, and may be fixed to the collar 10 so as not to be relatively rotatable. Alternatively, the spacer 11 may be fixed to a member which is not relatively rotatable after the spacer 11 is mounted on the annular clearance 33. In short, the main body section 23 of the spacer 11 may be rotatable relative to either one of members, i.e., the steering shaft 3 and the collar 10, and may be fixed to the other member so as not to be relatively rotatable.

As an example of a manner in which the spacer 11 is mounted on the annular clearance 33, a manner in which a stick material 25 being round, for example, circular in cross section and extending nearly straight is wound along the circumference R of the steering shaft 3 (see FIGS. 5A, 5B, and 5C) from the exterior through the locking hole 34 serving as an opening of the collar 10 to constitute the spacer 11 in a circular arc shape can be mentioned, as shown in FIG. 4 and FIGS. 5A, 5B, and 5C.

That is, the stick material 25 for constituting the spacer 11 is composed of a longitudinal member such as a wire, to constitute a windable member which can be wound around the outer periphery 31 of the steering shaft 3. The stick material 25 has a uniform cross section. The stick material 25 has first and second ends 21 and 22, and the above-mentioned engagement section 24 is previously folded in an orthogonal shape, for example, and formed at the first end 21. The stick material 25 includes a portion 23A serving as the main body section 23 of the spacer 11. The portion 23A serving as the main body section 23 is nearly straight in a free state (a no-load state).

Figure 5A:
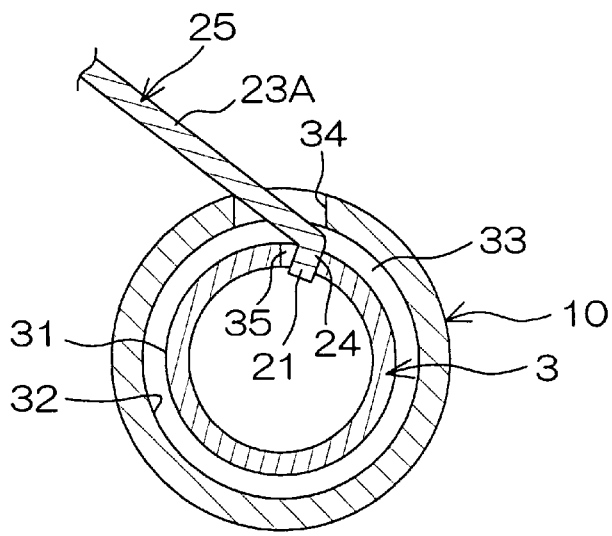
FIGS. 5A, 5B, and 5C are schematic views for successively explaining the procedure for work for mounting a spacer shown in FIG. 4.
Figure 5B:
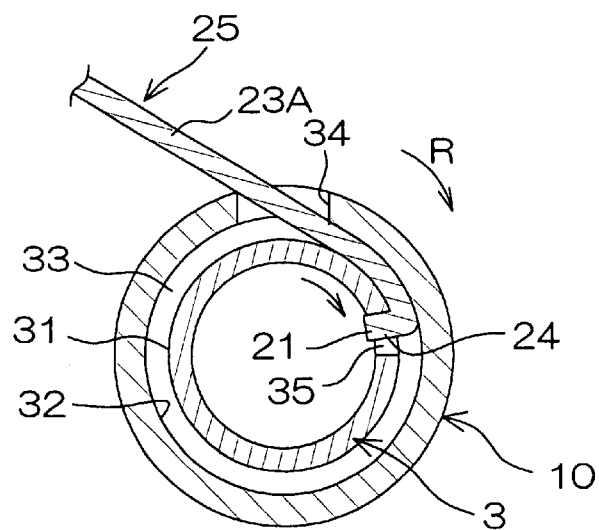
Figure 5C:
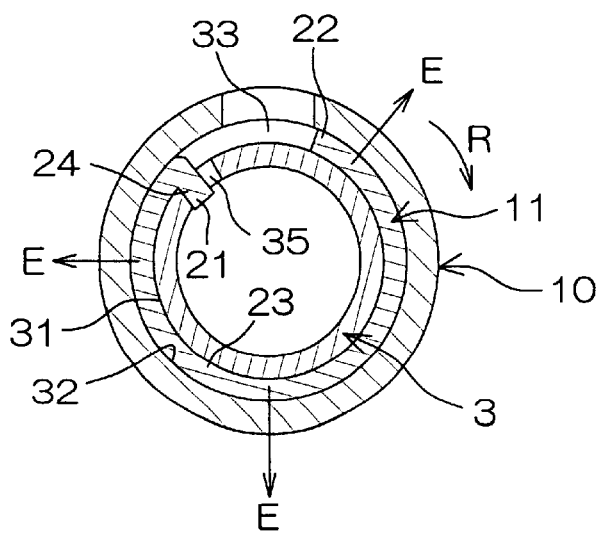

Referring to FIGS. 5A, 5B, and 5C, description is made of an operation for winding the stick material 25. As shown in FIG. 5A, the first end 21 of the stick material 25 is first pushed into the locking hole 34 from the outside of the collar 10, and the engagement section 24 at the first end 21 is engaged with the engagement hole 35 in the steering shaft 3 through the locking hole 34.

From this state, the steering shaft 3 and the collar 10 are relatively rotated. As shown in FIG. 5B, for example, the steering shaft 3 is rotated along a predetermined circumference R with the collar 10 fixed. Consequently, the stick material 25 is pulled into the annular clearance 33 utilizing the first end 21 of the stick material 25 as a leading end for leading the stick material 25 to be pulled into, and is gradually wound around the steering shaft 3 along the circumference R. The whole of the stick material 25 is soon wound around the annular clearance 33, to constitute the spacer 11, as shown in FIG. 5C.

In the process of winding the stick material 25, a sufficiently empty space exists in the annular clearance 33 until the whole of the stick material 25 is accommodated in the annular clearance 33, as shown in FIG. 5C. In the process of inserting the stick material 25, therefore, the steering shaft 3 can be slightly eccentric from the collar 10. Also from this point of view, the stick material 25 can be easily inserted into the annular clearance 33.

In other words, when the stick material 25 is wound along the circumstance R of the steering shaft 3 to constitute the spacer 11, the annular clearance 33 is successively filled in along the circumference R as the steering shaft 3 is wound. Consequently, the spacer 11 can be pressed in a state where there is room from a press-fit space in the annular clearance 33 at least in the first half of the pressing process. As a result, pressing work is easy.

The spacer 11 is mounted on the annular clearance 33 along the corresponding peripheral grooves 36 and 37 in the steering shaft 3 and the collar 10. The stick material 25 is easy to insert from the point of view of the fact that the insertion of the stick material 25 into the annular clearance 33 can be guided by each of the peripheral grooves 36 and 37 when the stick material 25 is inserted. When the stick material 25 is round, for example, circular in cross section, it is preferable that the cross section of each of the peripheral grooves 36 and 37 forms a curved shape such as a semi-circular shape in order to smooth the insertion of the stick material 25.

The present invention also has the advantage that the relative movement in the axial direction between the steering shaft 3 and the collar 10 can be regulated by the spacer 11 mounted on the pair of the peripheral grooves 36 and 37.

The stick material 25 is pulled into the annular clearance 33 utilizing the first end 21 thereof as the leading end. Accordingly, it is easy to insert the stick material 25 into the annular clearance 33. Contrary to this, if it is assumed that the stick material 25 is pressed into the annular clearance 33 through the second end 22 of the stick material 25, pressing work must be carefully performed such that the spacer 11 does not buckle. Accordingly, it takes much time and labor to insert the stick material 25.

A mounting opening used for mounting the spacer 11 on the annular clearance 33 is also used as the locking hole 34 indispensable for the steering locking device 9. Accordingly, the mounting opening is desirable for simplifying the structure.

The main body section 23 of the spacer 11 is fixed to the steering shaft 3 inside the annular clearance 33, and is pressed against the inner periphery 32 of the collar 10 by a diameter enlarging force (see an arrow E in FIG. 5C) by spring properties of the spacer 11 itself which attempts to expand outward in the radial direction.

The frictional resistance between the inner periphery 32 of the collar 10 and an outer periphery of the spacer 11 is reliably obtained by the above-mentioned diameter enlarging force. Consequently, it is also possible to make the pressing work easy by reducing the difference in dimension in the radial direction between the collar 10 and the spacer 11, for example. Even if a press-fitted state between the collar 10 and the spacer 11 is loosened, the press-fitted state is maintained by the diameter enlarging force, thereby making it possible to reliably prevent the steering shaft 3 from being rotated. It is presumed that the diameter enlarging force loosens the press-fitted state between the steering shaft 3 and the spacer 11. However, there is no problem because the steering shaft 3 and the spacer 11 are fixed to each other.

Figure 6:
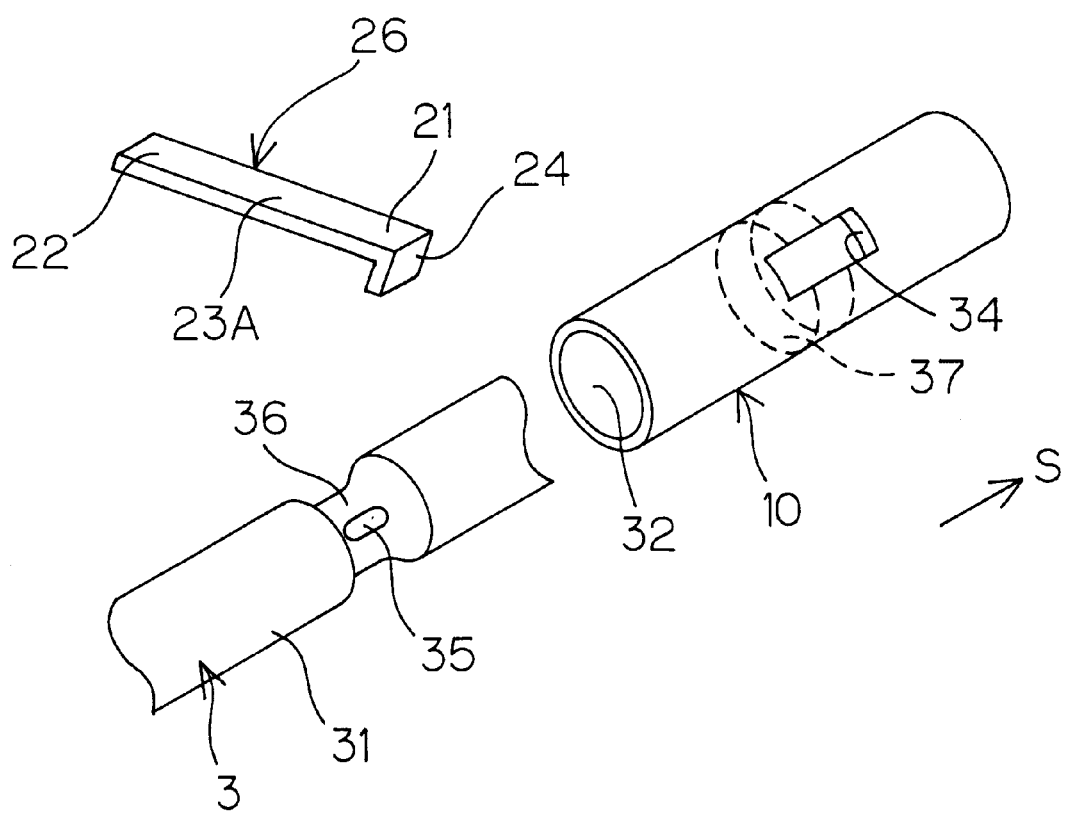
FIG. 6 is an exploded perspective view of a principal part of a steering locking device according to another embodiment of the present invention.

FIG. 6 illustrates a steering locking device according to another embodiment of the present invention. Referring to FIG. 6, the present embodiment differs from the embodiment shown in FIG. 4 in that the stick material 25 which is round in cross section is used as a windable member in the embodiment shown in FIG. 4, while a longitudinal plate material 26 which is rectangular in cross section, for example, is used in the present embodiment.

In the present embodiment, an engagement hole 35 is formed into a long hole adaptable to the cross-sectional shape of the plate material 26. Further, the cross-sectional shapes of peripheral grooves 36 and 37 respectively formed in an outer periphery 31 of a steering shaft 3 and an inner periphery 32 of a collar 10 are an approximately rectangular shape adaptable to the cross-sectional shape of the plate material 26. In FIG. 6, the same constituent elements as those in the embodiment shown in FIG. 4 are assigned the same reference numerals and hence, the description thereof is not repeated.

Figure 4:
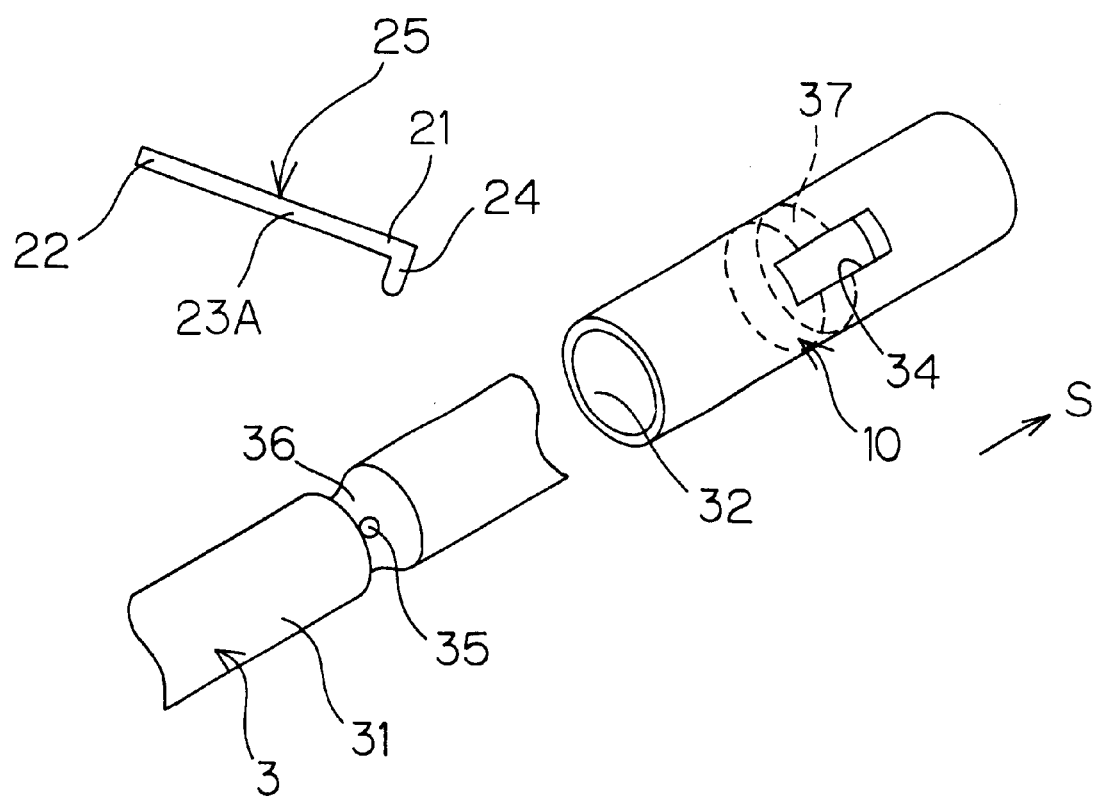
FIG. 4 is an exploded perspective view showing a principal part of the steering locking device shown in FIG. 1.

Also in the present embodiment, the same function and effect as those in the embodiment shown in FIG. 4 can be produced. For example, the steering locking device is low in cost, as in the case where the stick material 25 shown in FIG. 4 is used. Further, a spacer 11 can be easily fixed to the steering shaft 3 by a simple structure in which the steering shaft 3 is merely provided with the engagement hole 35 to catch an engagement section 24.

In the embodiments shown in FIGS. 4 and 6, the spacer 11 mounted in the annular clearance 33 can be also removed from the annular clearance 33 as required in such a case where it is decomposed for maintenance. That is, a second end 22 of the spacer 11 which is a rear end at the time of the mounting is pulled out into a locking hole 34 using a tool.

When the steering shaft 3 is rotated relative to the collar 10 in the opposite direction to the direction of rotation at the time of pressing, a large part of the spacer 11 is pushed out of the collar 10 through the locking hole 34. When catching engagement between the first end 21 of the spacer 11 and the steering shaft 3 is released, the spacer 11 can be easily removed.

In a case where the spacer 11 having ends and forming a circular arc shape as in each of the above-mentioned embodiments, an indentation is difficult to produce in the collar 10 and the steering shaft 3, as compared with a case where a conventional endless and annular spacer is used. Accordingly, the collar 10 and the steering shaft 3 can be also reused.

Although in each of the above-mentioned embodiments, the locking hole 34 is formed in one place along the circumference of the collar 10, locking holes 34 may be provided in a plurality of places along the circumference. The number of spacers 11 is not limited to one. It is also considered that a plurality of spacers 11 are provided.

In each of the above-mentioned embodiments, only one of the pair of peripheral grooves 36 and 37 may be provided.

Figure 7:
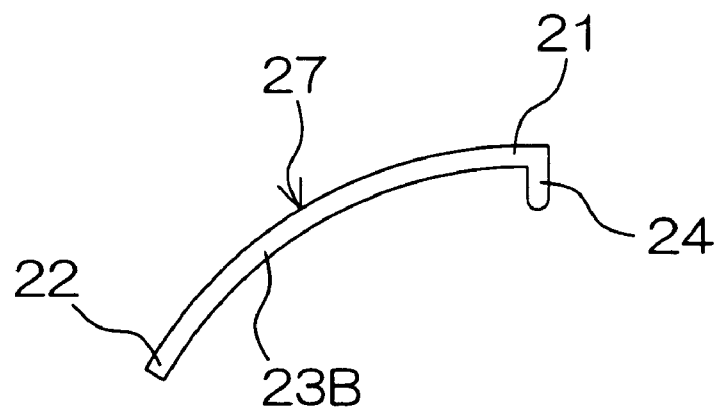
FIG. 7 is a side view of a windable member used for a spacer in still another embodiment of the present invention.

Although in each of the above-mentioned embodiments, the stick material 25 and the plate material 26 which are nearly straight are used as the spacer 11, it is possible to use a windable material 27 (see FIG. 7) composed of a stick material or a plate material whose outer periphery in a free state has a curvature larger than the curvature of the inner periphery 32 of the collar 10. The windable material 27 has a portion 23B serving as a main body section, and the portion 23B serving as the main body section forms a curved shape. Also in this case, a diameter enlarging force which is approximately uniform can be easily obtained over the whole periphery of the spacer 11 by an elastic restoring force of the spacer 11 which attempts to return to the free state after being wound around the steering shaft 3.

The dimensions of the annular clearance 33 may be ones in which the spacer 11 can be accommodated in a press-fitted state.

While the present invention has thus been described in detail by way of the specific embodiments thereof, those skilled in the art will easily come up with variations, modifications and equivalents of the embodiments in light of the disclosure. Therefore, it should be understood that the scope of the present invention be defined by the appended claims and their equivalents.

What is claimed is:

1. A steering locking device for restraining an operation of a steering wheel at a time of locking, comprising:

a collar surrounding a steering shaft which is rotated integrally with the steering wheel, the collar being provided with an opening, an annular clearance being formed between an outer periphery of the steering shaft and an inner periphery of the collar;

a spacer press-fitted in the annular clearance and being formable into a circular arc shape surrounding the steering shaft, the spacer being formed of a woundable member which is woundable around the steering shaft from an outside of the collar through the opening of the collar, the spacer being elastically deformable so as to increase or decrease a diameter of the circular arc formed by the spacer;

a locking device main body fixed to a fixing member; and a locking member supported on the locking device main body and being displaceable to a locked position for preventing the collar from being rotated, and a locking released position, wherein a relative rotation between the steering shaft and the collar is restrained by the spacer in a case where a torque applied to the steering shaft is not more than a predetermined torque when the collar is prevented from being rotated by the locking member at the locked position, and wherein the spacer is connected to the steering shaft so as to be integrally rotatable, and is pressed against the inner periphery of the collar by such an elastic restoring force that the spacer attempts to return to a free state.

2. The steering locking device according to claim 1, wherein the woundable member forms a nearly straight shape or a curved shape in a free state.

3. The steering locking device according to claim 1, wherein the opening of the collar includes a locking opening engaged with the locking member at the locked position for preventing the collar from being rotated.

4. The steering locking device according to claim 1, wherein the spacer has a uniform cross-sectional shape.

5. The steering locking device according to claim 1, wherein an engagement section is provided at one end of the spacer, and a relative rotation between the steering shaft and the spacer is restrained by engagement between the engagement section and an engagement hole in the steering shaft.

6. A steering locking device 4 for restraining an operation of a steering wheel at a time of locking, comprising:

a collar surrounding a steering shaft which is rotated integrally with the steering wheel, the collar being provided with an opening, an annular clearance being formed between an outer periphery of the steering shaft and an inner periphery of the collar;

a spacer press-fitted in the annular clearance and being formable into a circular arc shape surrounding the steering shaft, the spacer being formed of a woundable member which is woundable around the steering shaft from an outside of the collar through the opening of the collar, the spacer being connected to either the steering shaft or the collar so as to be integrally rotatable;

a locking device main body fixed to a fixing member; and a locking member supported on the locking device main body and being displaceable to a locked position for preventing the collar from being rotated, and a locking released position, wherein a relative rotation between the steering shaft and the collar is restrained by the spacer in a case where a torque applied to the steering shaft is not more than a predetermined torque when the collar is prevented from being rotated by the locking member at the locked position, and wherein an engagement section is provided at one end of the spacer and a the relative rotation between the steering shaft and the spacer is restrained by engagement between the engagement section and an engagement hole in the steering shaft.

7. The steering locking device according to claim 6, wherein the spacer is elastically deformable so as to increase or decrease the diameter of the circular arc formed by the spacer.

8. The steering locking device according to claim 6, wherein the spacer has a uniform cross-sectional shape.

9. The steering locking device according to claim 6, wherein the woundable member forms a nearly straight shape or a curved shape in a free state.

10. The steering locking device according to claim 6, wherein the opening of the collar includes a locking opening engaged with the locking member at the locked position for preventing the collar from being rotated.

* * * * *